July 18, 1950     W. H. BENNETT     2,515,182
APPARATUS FOR DISCHARGING STATIC
ELECTRICITY FROM AIRCRAFT Filed Feb. 28, 1947     2 Sheets-Sheet 1

*INVENTOR.*

WILLARD H. BENNETT

BY

William D. Hall

Attorney

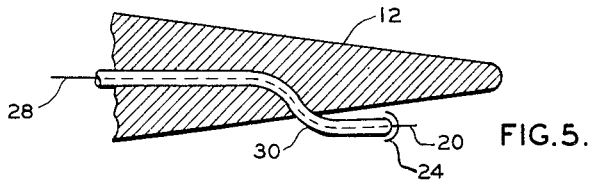
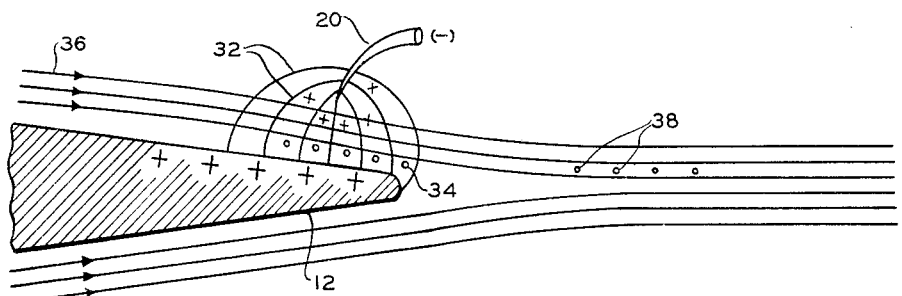
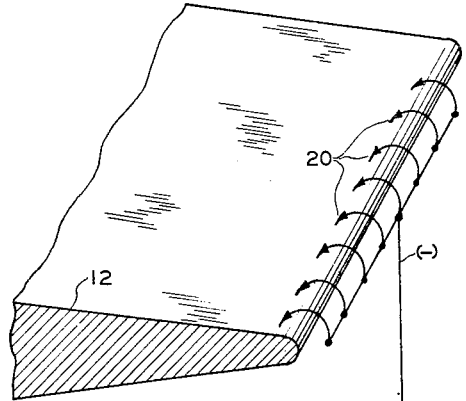
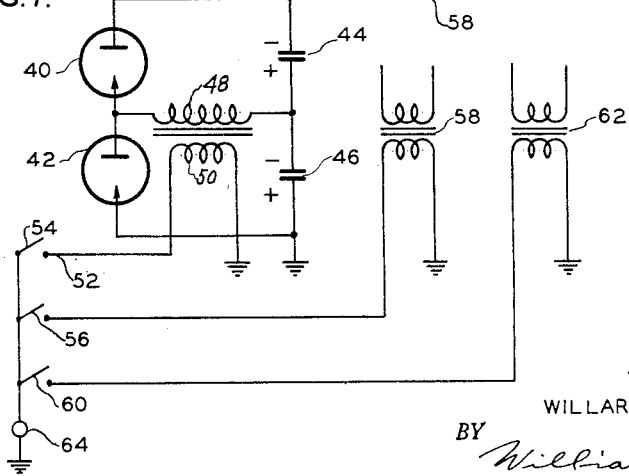

Patented July 18, 1950

2,515,182

UNITED STATES PATENT OFFICE 2,515,182

APPARATUS FOR DISCHARGING STATIC ELECTRICITY FROM AIRCRAFT

Willard H. Bennett, Chevy Chase, Md.

Application February 28, 1947, Serial No. 731,455

10 Claims. (Cl. 175—264)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for preventing the accumulation of electric charge on an aircraft during flight.

The accumulation of electric charge on an aircraft during flight is objectionable because the uncontrolled discharge of electricity from various projecting parts of the airplane in the form of corona produces local electrical oscillations which interfere with radio reception.

Corona discharges from an aircraft may be produced by atmospheric electric fields when the airplane is in the vicinity of electrically charged clouds and is known as field static.

Corona discharges may also be due to the continual accumulation of electric charges on an airplane when moving through atmosphere carrying snow or ice crystals and is known as snow static. Snow static is produced by the rubbing of snow or ice crystals against the surfaces of the aircraft during flight. The rate of charge accumulation or charging current increases with the speed and area of the frontal surfaces of the aircraft.

Field static is much more severe than snow static, but its duration is usually limited to periods of a minute or less with intervening intervals of several minutes or more when radio navigation and communication are practicable. Field static frequently occurs combined with snow static, but the great bursts of corona due to fields may not interfere seriously with navigation and communication, if snow static is eliminated.

Snow static, however, constitutes a most serious hazard to aircraft because it occurs in widespread areas of snow and ice crystals and renders the radio navigational aids useless for periods of time of half hour or longer.

The primary object of the present invention is the elimination of snow static.

The present invention provides numerous sharp points for corona discharge, and provides means for artificially building up a charge on the airplane of polarity opposite to that picked up by the plane in flight. The artificially produced charge neutralizes the charge picked up and increases automatically with the rate of pick up so as in general to prevent the amount of corona discharge from the individual sharp points exceeding the radio noise limit.

According to this invention the artificial charge on the plane is produced by applying a source of high potential direct current to a multiplicity of sharp points, thereby producing a silent corona discharge between the points and the surface of the plane. These corona points are located in the slip stream of the plane so that the negative ions produced are swept away by the air stream thus leaving a positive charge on the plane. Since the charge picked up by the plane is negative, the elimination of negative ions by the artificially produced corona neutralizes the snow static charge picked up.

The invention will be understood by reference to the drawings in which:

Fig. 5 shows another form of corona discharge element.

Fig. 6 is a schematic diagram showing roughly the phenomena occurring in the corona discharge.

Fig. 7 is a schematic diagram of a rectifier and a group of corona discharge points.

Figure 1:
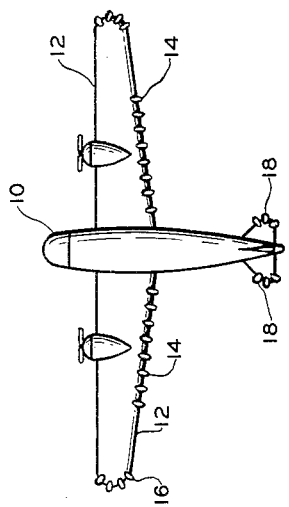
Fig. 1 is a general view of an airplane showing the preferred location of the corona points.

Referring now to Fig. 1, the airplane 10 is provided with groups of corona discharge points 14 mounted on the trailing edges of the wings 12. Other groups of corona points are located on the wing tips as at 16 and on the tail members as at 18.

Figure 2:
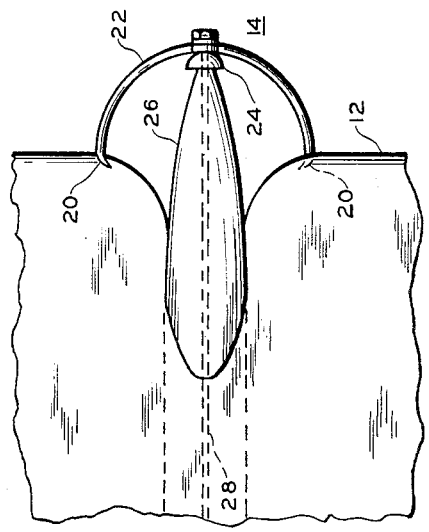
Fig. 2 is a plan view showing the method of mounting one of the corona discharge units on the trailing edge of a wing.

In Fig. 2 a plan view of a corona discharge unit is shown generally at 14 mounted on the trailing edge of a wing 12. A fork shaped conductor 22 of appreciable diameter has its extremities 20 sharpened to points whose radius of curvature is approximately 0.001 inch or less. The forked conductor 22 is supported by a suitable streamlined insulator 26 set in a recess in the wing. A metal corona shield 24 prevents the high concentration of electric field on the insulator surface just under the shield which would otherwise tend to form surface streamers. A supply conductor 28 passing through the center of the insulator connects the pointed corona conductor 22 to a source of high potential direct current. The corona discharge takes place between the sharp metal points 20 and the wing surface 12.

Figure 4:
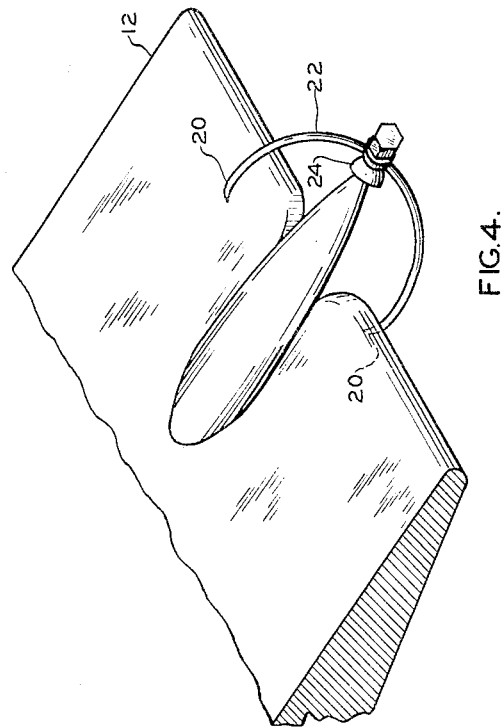
Fig. 4 is an isometric view of a corona unit on the trailing edge of a wing.
Figure 3:
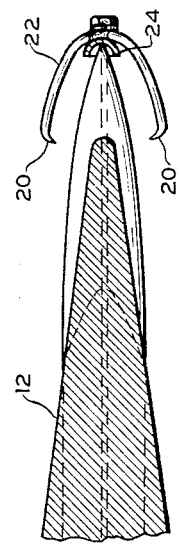
Fig. 3 is a side view of a corona unit looking parallel to the edge of the wing.

Figs. 3 and 4 are side and isometric views, respectively, of the structure shown in Fig. 2. The same numbers correspond to the same parts.

In Fig. 5 is shown another form of corona discharge device. The corona point 20 and corona shield 24 are supported by an insulator 30 set in the underside of wing 12. Conductor 28 supplies the high potential from the source of direct current.

When an airplane moves through atmosphere containing snow or ice crystals, the charge produced on the plane by rubbing against the ice crystals raises the potential of the plane negatively until a corona discharge occurs from projecting parts or points on the plane. A balance occurs when the corona discharge current just equals the pick-up current. If no special provision is made, the discharge will take place at points on the plane where the electric field intensity chances to be high such as propeller tips, wing tips, gun barrels, the radio antenna and the like. In this case the potential of the plane above the atmosphere must be quite high in order to dissipate the pick-up current. The resulting discharge is disruptive and results in violent radio static.

If the plane is provided with a large number of sharp corona points, the plane potential is greatly reduced and the discharge occurs silently with little visibility and radio interference is avoided.

The ideal method of eliminating snow static would be to have the pick-up current discharge automatically and silently into the atmosphere without rise in plane potential.

With any kind of simple corona point this is impossible since there always exists a limiting minimum or threshold potential below which no discharge takes place. The discharge takes place according to the equation $$i = K[E - E_0]^2$$

where $i$ is the discharge current, $E$, the potential of the corona point, $E_0$, the minimum or threshold potential, and $K$, a constant depending on the sharpness of the point. Thus with the method of discharge using sharp points only, the plane potential must always exceed the threshold potential $E_0$ and there is not much margin left between the beginning of silent corona discharge and the beginning of noise producing disruptive discharge.

According to the present invention the threshold potential limitation is avoided and discharge can occur not only at zero potential, but a negative current discharge can occur when the plane is at a positive potential relative to the surrounding atmosphere. In other words the present invention provides a new type of silent discharge not subject to the limitations inherent in a simple corona point.

The nature of the new type of discharge will be better understood by reference to Fig. 6 which is a schematic representation of the phenomena which occurs when a slip stream blows through a region undergoing corona discharge from a sharp point to a large substantially flat surface. In the diagram, a silent corona discharge takes place between the sharp point 20 and the large surface of the trailing edge of the airplane wing 12. The difference of potential between the corona point and the wing surface is approximately 5000 volts, the corona point being negative. The discharge takes place along the lines of force of the electric field as indicated roughly by the lines 32. At the point 20 the concentration of electric field is great owing to the sharpness of the point as is well known in the theory of electrostatics. The field intensity diminishes rapidly on leaving the surface of the point where it is maximum and becomes a minimum at the wing surface 12. The principal ionization occurs in the intense field near the point where free electrons are emitted by impact of positive ions which closely surround the point and provide a positive space charge in the vicinity of the point. Negative ions formed by collision with electrons move toward the wing surface where they are more plentiful and are weakly held because of the weak electric field. The slip stream 36 which blows violently through the corona region carries away both positive and negative ions, but the negative ions being more weakly held are carried away in greater numbers. The net effect is the loss of negative charge which accordingly leaves the plane with a positive charge. As the action continues the accumulated positive charge on the plane holds the negative ions more strongly on the wing tip. The rising positive charge on the plane makes the potential of the corona point itself more positive with respect to the air. Thus the negative discharge from the corona point gradually decreases toward zero, and the action becomes in a manner, self regulating.

Thus a plane equipped with these artificially pre-ionized corona discharge points acquires a normal positive potential. When the plane encounters atmosphere carrying snow and ice crystals, it picks up negative charge which gradually neutralizes the normal positive potential. As the positive potential of the plane falls, the negative ions near the wing surface are less strongly held and are blown away in greater numbers thus carrying away the negative charge picked up from the snow particles. If a sufficient number of corona discharge points is provided, the entire static pick-up charge may be carried away without permitting the plane potential to exceed the corona noise limit for satisfactory radio reception.

In Fig. 7 is shown a schematic diagram of a rectifier connected to a group of corona discharge points mounted on the trailing edge of a wing. The corona points 20 discharge to the substantially flat wing surface 12, being energized through the lead 58 from the rectifier tubes 40 and 42. These tubes may be of the cold cathode type, if desired, and arranged in a circuit well known in the art, such, for example, as that shown in the diagram. The rectifier tubes are energized by the high voltage transformer secondary 48 connected as shown between the mid-point of the condensers 44 and 46 and the anode-cathode junction of the tubes. The transformer primary 50 is connected to a source of alternating current potential 64 by lead 52 and switch 54. Each group of corona discharge points is similarly supplied through switches 56 and 60 and corresponding transformers 58 and 62 thus permitting adjustment of the number of active corona points to suit the amount of static charge picked up.

I claim:

1. A device for the discharge of negative electricity acquired by an airplane in flight comprising, a sharp conducting point positioned near to and spaced apart from a flat surface of the airplane forming a discharge gap therewith swept by the slip stream, the axis of said discharge gap being substantially at right angles to the slip stream, and a source of direct current potential of the order of 5000 volts, the negative terminal of said source connected to the sharp conducting point and the positive terminal thereof to the said flat surface.

2. A device for discharging the negative charge acquired by an aerial body in flight comprising, a discharge gap positioned in a portion of space swept by the slip stream of said body, said discharge gap including an electrically exposed sharp conducting point positioned near to and pointed toward a portion of substantially flat surface of the air foil of said body forming a discharge gap, the axis of said discharge gap being substantially at right angles to the slip stream, and a source of direct current potential of the order of 5000 volts, the negative terminal of said source connected to the sharp conducting point and the positive terminal thereof to said flat surface.

3. A device for discharging the negative charge acquired by an aerial body in flight comprising, a pre-ionized discharge gap positioned in a portion of space immediately adjacent a substantially flat portion of surface forming part of the air foil of said body swept by the slip stream thereof, said discharge gap including an electrically exposed sharp conducting point near to and pointed toward a portion of said substantially flat surface forming a discharge gap, the axis of said discharge gap being substantially at right angles to the slip stream, and a source of direct current potential of the order of 5000 volts, the negative terminal of said source connected to the sharp conducting point and the positive terminal thereof to said flat surface.

4. A device for discharging the negative charge acquired by an airplane in flight comprising, a pre-ionized discharge gap positioned in the slip stream of the plane, said discharge gap including an electrically exposed sharp conducting point near to and pointed toward a portion of substantially flat surface of the wings and tail swept by the slip stream thereof forming a discharge gap therewith, the axis of said discharge gap being substantially at right angles to said slip stream, and a source of direct current potential of the order of 5000 volts, the negative terminal of said source connected to the sharp conducting point and the positive terminal thereof to the said flat surface.

5. A device for discharging the negative charge acquired by an airplane in flight having wing and tail surface comprising, an unsymmetrical pre-ionized discharge gap located in the slip stream of the plane and exposed to the air blast thereof, said discharge gap comprising a sharp conducting point spaced from a portion of said substantially flat surface, said point forming a discharge gap with the said portion of surface, the axis of said point to surface discharge gap being substantially at right angles to the slip stream, and a source of direct current potential of the order of 5000 volts, the negative terminal of said source connected to the sharp conducting point and the positive terminal thereof to the said flat surface.

6. A system for discharging negative electricity acquired by an airplane in flight comprising, a plurality of singular separated pre-ionized discharge gaps distributed over the surface of the wings and tail of said airplane located in the slip stream thereof, each discharge gap consisting of a sharp conducting point adjacent to and spaced from a portion of the substantially flat surface of said wings and tail and swept by the slip stream thereof, the axis of said discharge gap between point and flat surface being substantially at right angles to the slip stream, and a source of direct current potential of the order of 5000 volts, the negative terminal of said source connected to the sharp conducting point and the positive terminal thereof to the said flat surface.

7. A system for the discharge of negative electricity acquired by an airplane in flight having wing and tail surface comprising, a pair of sharp conducting points each spaced from a portion of said surface, each of said points forming a discharge gap with the said portion of the surface, the axis of each of said discharge gaps being substantially at right angles to the slip stream over said surface, an insulator projecting rearwardly from a trailing edge of said surface and supporting said sharp points each in spaced relation from the said surface, and a source of direct current potential of the order of 5000 volts, the negative terminal of said source connected to the sharp conducting point and the positive terminal thereof to the said flat surface.

8. The structure of claim 5 wherein an insulator body is set in the trailing edge of said airplane projecting rearwardly therefrom, and a forked conductor having sharply pointed extremities supported on said insulator extending forwardly beyond said edge and inwardly toward two portions of substantially flat surface on the top and bottom faces respectively of said surface and forming therewith two electrically separate point-to-plane discharge gaps swept by the slip stream over said surfaces.

9. A system for the discharge of static electricity acquired by an airplane in flight having wing and tail surface comprising a plurality of pairs of pre-ionized discharge gaps distributed over said surface of said airplane, each said pair being formed by a forked conductor having sharply pointed extremities extending forwardly beyond a trailing edge of said surface and inwardly toward portions of substantially flat surface on opposite faces of said wings and tail forming therewith electrically separate point-to-flat surface discharge gaps swept by the slip stream, the axis of each discharge gap being substantially at right angles to said slip stream, insulator means supporting each said forked conductor set in said trailing edge and projecting rearwardly, a supply conductor within each insulator connected to said forked conductor, a metal corona shield mounted on each said insulator, and rectifier means forming a source of direct current potential of the order of 5000 volts, the negative terminal of said source connected to said sharp pointed conductors, the positive terminal thereof connected to the body of said airplane.

10. A system for the discharge of static electricity acquired by an airplane in flight comprising, a plurality of singular separated pre-ionized discharge gaps distributed over the under surface of the wings of said airplane and located in the slip stream thereof, each discharge gap consisting of a sharp conducting point near to and spaced from a portion of substantially flat surface on the underface of said wings and forming therewith a point-to-surface discharge gap swept by the slip stream, the axis of said discharge gap between point and flat surface being substantially at right angles to said slip stream, insulator means projecting through the underface of said wings supporting each said sharp point, a metal corona shield mounted on each insulator, a supply conductor within each insulator connected to said sharp point, and rectifier means forming a source of direct current potential of the order of 5000 volts, the negative terminal thereof connected to said supply conductors, the positive terminal connected to the body of said airplane.

WILLARD H. BENNETT.

REFERENCES CITED

The following references are of record in the file of this patent:

UNITED STATES PATENTS

| Number | Name | Date |
|---|---|---|
| 878,273 | Chapman | Feb. 4, 1908 |
| 2,303,321 | Bennett | Dec. 1, 1942 |
| 2,333,144 | Bennett et al. | Nov. 2, 1943 |
| 2,352,411 | Sandretto | June 27, 1944 |
| 2,386,647 | Andresen | Oct. 9, 1945 |